US008457693B2

(12) United States Patent
Song et al.

(10) Patent No.: US 8,457,693 B2
(45) Date of Patent: *Jun. 4, 2013

(54) POWER CONSUMPTION CONTROL APPARATUS IN PDA PHONE

(75) Inventors: Dong-Sub Song, Seoul (KR); Joy Yim, Seoul (KR)

(73) Assignee: LG Electronics Inc., Seoul (KR)

( * ) Notice: Subject to any disclaimer, the term of this patent is extended or adjusted under 35 U.S.C. 154(b) by 138 days.

This patent is subject to a terminal disclaimer.

(21) Appl. No.: 12/821,539

(22) Filed: Jun. 23, 2010

(65) Prior Publication Data

US 2010/0261511 A1      Oct. 14, 2010

Related U.S. Application Data

(63) Continuation of application No. 12/758,704, filed on Apr. 12, 2010, which is a continuation of application No. 11/055,226, filed on Feb. 9, 2005, now Pat. No. 7,725,139.

(30) Foreign Application Priority Data

Mar. 17, 2004   (KR) .................. 10-2004-0018114

(51) Int. Cl.
    *H04Q 7/20*   (2006.01)
(52) U.S. Cl.
    USPC ........ 455/574; 455/572; 455/550.1; 455/557; 455/343.1; 455/343.2; 370/310; 370/311
(58) Field of Classification Search
    USPC .................. 455/574, 572, 550.1, 557, 556.1, 455/556.2, 575.1–575.8, 343.1–343.6, 422.1, 455/403, 500, 517; 370/310, 311
    See application file for complete search history.

(56) References Cited

U.S. PATENT DOCUMENTS

| 5,167,024 A | | 11/1992 | Smith et al. |
| 5,570,413 A | * | 10/1996 | Ahlberg et al. ............ 455/550.1 |
| 5,675,524 A | | 10/1997 | Bernard |
| 5,790,875 A | | 8/1998 | Andersin et al. |

(Continued)

FOREIGN PATENT DOCUMENTS

EP      0567957 A1     4/1993

OTHER PUBLICATIONS

US Office Action dated Jan. 4, 2012 for U.S. Appl. No. 12/758,704, 4 pages.

(Continued)

*Primary Examiner* — Keith Ferguson
(74) *Attorney, Agent, or Firm* — Fish & Richardson P.C.

(57) ABSTRACT

A mobile device is configured to control power consumption. The mobile device includes a detector configured to detect at least one of an active input or a passive condition. The passive condition is determined to be present based on a comparison of a device state or a change in the device state to a threshold. A controller is configured to respond to the detected active input or passive condition by causing less than all components in the mobile device, including the display screen of the mobile device, to enter a power saving mode from within in a calling mode, where an amount of power supplied to the display screen is reduced in the power saving mode. Operational modes of the mobile device include the power saving mode and the calling mode. The mobile device consumes more power in the calling mode than in the power saving mode.

32 Claims, 2 Drawing Sheets

U.S. PATENT DOCUMENTS

| | | | |
|---|---|---|---|
| 6,278,887 B1 * | 8/2001 | Son et al. | 455/566 |
| 6,725,060 B1 | 4/2004 | Chhatriwala et al. | |
| 6,816,977 B2 * | 11/2004 | Brakmo et al. | 713/323 |
| 7,254,730 B2 | 8/2007 | Kardach et al. | |
| 7,260,390 B1 | 8/2007 | Skinner et al. | |
| 7,269,563 B2 | 9/2007 | Douros | |
| 7,706,772 B2 | 4/2010 | Malcolm | |
| 2002/0032044 A1 | 3/2002 | Kume | |
| 2004/0034805 A1 | 2/2004 | Chuang et al. | |
| 2004/0082362 A1 | 4/2004 | Peng et al. | |
| 2008/0070639 A1 | 3/2008 | Goris et al. | |

OTHER PUBLICATIONS

First Action Interview Office Action Summary dated Mar. 15, 2012 for U.S. Appl. No. 12/758,704, 3 pages.

* cited by examiner

|  | NON-SLEEP | SLEEP |
|---|---|---|
| SLEEP |  | 21.2mW |
| IDLE | 296~525.2mW | |
| CALLING/CALLED | 296~525.2mW | 21.2mW |
| IN-CALL | 1389.0~2049.8mW | 1334.7~1926.0mW |

POWER CONSUMPTION CONTROL APPARATUS IN PDA PHONE

CROSS-REFERENCE TO RELATED APPLICATIONS

This application is a continuation of U.S. application Ser. No. 12/758,704, filed Apr. 12, 2010, currently pending, which is a continuation of U.S. application Ser. No. 11/055,226, filed Feb. 9, 2005, now U.S. Pat. No. 7,725,139, which claims the benefit of earlier filing date and right of priority to Korean Patent Application No. 10-2004-0018114, filed on Mar. 17, 2004, the contents of which are hereby incorporated by reference herein in their entirety.

BACKGROUND OF THE INVENTION

1. Field of the Invention

The present invention relates to a personal digital assistant (PDA) phone, and more particularly, to a power consumption control apparatus in a PDA phone.

2. Description of the Background Art

In general, a personal digital assistant (PDA) is a kind of hand-held (pocket-size) microcomputer. The PDA is typically used for arrangement schedule, memo writing and personal information management. In addition to the arrangement schedule, the PDA can be also used for the field of the mobile Internet or the like. In other words, the PDA can be considered as equipment in which various control functions and an Internet access function of a notebook computer are put together with a small size of electronic organizer.

Recently, as interest in PDAs increases, the number of users has grown larger. A PDA phone which has the cellular phone function in addition to various functions of the PDA has come into the market. Since the PDA phone converges the functions of the PDA and the phone function, it is necessary that operation methods for the PDA phone should be arranged according to various states.

As functions of user equipment driven by portable batteries such as smart phones and PDA phones become complicated and varied, and the performance of user equipment is enhanced, power consumption per unit of time is considerably increased. Accordingly, in order to reduce the power consumption of the user equipment, controlling the power for software and hardware becomes more important to design the user equipment. Hardware components such as a CPU, a memory device, an LCD and the like which constitute the user equipment cause this multifunction, high-performance user equipment to consume much power.

Particularly, a PDA phone in accordance with the conventional art comprises a sleep mode, an idle mode, a called mode, an in-call mode and a calling mode. A mode of the PDA phone in accordance with the conventional art can be transitioned only from the sleep mode to the idle mode. The mode of the PDA phone in accordance with the conventional art can be transitioned only from the idle mode to the sleep mode.

Hereinafter, a state transition of the conventional PDA phone will be described in detail with reference to FIG. 1.

FIG. 1 is a state transition diagram of a PDA phone in accordance with the conventional art.

As shown in FIG. 1, when a user wakes up the PDA phone, a sleep mode 11 is transitioned to an idle mode 12 (S11). In a state of the idle mode 12, the idle mode 12 is transitioned to the sleep mode 11 automatically after a certain amount of time or by user's input signal (S12).

When a call signal is received in the state of the idle mode 12, the idle mode 12 is transitioned to a called mode (S13). If the call signal is not accepted in a state of the called mode 13, that is, if the user does not answer the phone, the called mode 13 is transitioned to the idle mode 12 (S14).

If the received call signal is accepted in the state of the called mode 13, that is, if the user answers the phone, the called mode 13 is transitioned to the in-call mode 14 (S15).

In addition, if the user presses a telephone number signal in order to make a phone call with the other party in the state of the idle mode 12, that is, sends a call signal, the idle mode 12 is transitioned to a calling mode 15 (S16). If the user cancels the sent call signal in a state of the calling mode 15, that is, if the user stops making a phone call, the calling mode 15 is transitioned to the idle mode 12 again (S17).

If the other party accepts the call signal in the state of the calling mode 15, that is, if the other party answers the phone, the calling mode 15 is transitioned to the in-call mode 14 (S18).

If the call signal is terminated in a state of the in-call mode 14, that is, if the user terminates the call, the in-call mode 14 is transitioned to the idle mode 12 (S19).

Here, the sleep mode 11 cannot be implemented by the user. In the sleep mode 11, a screen of the PDA phone is turned off, touch input and keypad input cannot be made and a state only for answering the phone is maintained. Accordingly, the PDA phone operates in the sleep mode 11 at the minimum power.

The idle mode 12 is a state that the power which is applied to a CPU, a cache and a buffer is cut off. In addition, the idle mode 12 is a mode that when an interrupt occurs, the sleep mode, the called mode, the in-call mode and the calling mode return. Here, in the idle mode 12, user's operation is all allowed, the screen of the PDA phone is turned on, and touch input and keypad input can be made. That is, the idle mode is a state only for the PDA purpose. Since the PDA phone operates in the idle mode 12 with a certain amount of power internally consumed, the PDA phone consumes more power in the idle mode than in the sleep mode 11.

The called mode 13 is a state that the call signal sent by the other party is received and a telephone bell rings before the phone call is connected. Therefore, the PDA phone consumes more power in the called mode 13 than in sleep mode 11.

The in-call mode 14 is a state that voice communication with the other party is performed. Accordingly, the PDA phone consumes more power in the in-call mode 14 than in the sleep mode 11.

The calling mode 15 is a state that the user sends a call signal before the phone call is connected. Accordingly, the PDA phone consumes more power in the calling mode 15 than in the sleep mode 11.

However, since the PDA phone in accordance with the conventional art maintains the called mode, the in-call mode and the calling mode even in unnecessary steps, there is a problem that the PDA phone consumes much power. In addition, the conventional PDA phone is unable to cope with the circumstances which may occur in every state.

SUMMARY OF THE INVENTION

Therefore, an object of the present invention is to provide a power consumption control apparatus and a method thereof in a PDA phone in accordance with the present invention which can reduce power consumption of the PDA phone by transiting the PDA phone from a called mode, an in-called mode and a calling mode to a sleep mode, and cope with the circumstances which may occur in every state of the PDA phone.

To achieve these and other advantages and in accordance with the purpose of the present invention, as embodied and broadly described herein, there is provided a power consumption control method in a PDA phone which comprises: transiting the PDA phone from an idle mode to a sleep mode automatically after a certain amount of time or by user's input signal; transiting the PDA phone from a called mode to the sleep mode automatically after a certain amount of time or by user's input signal; transiting the PDA phone from a calling mode to the sleep mode automatically after a certain amount of time or by user's input signal; and transiting the PDA phone from an in-call mode to the sleep mode automatically after a certain amount of time or by user's input signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, the preferred embodiments of a power consumption control apparatus and a method thereof in a PDA phone in accordance with the present invention which can reduce power consumption of the PDA phone by transitioning the PDA phone from a called mode, an in-call mode and a calling mode to a sleep mode, and cope with the circumstances which may occur in every state of the PDA phone.

Figure 1:
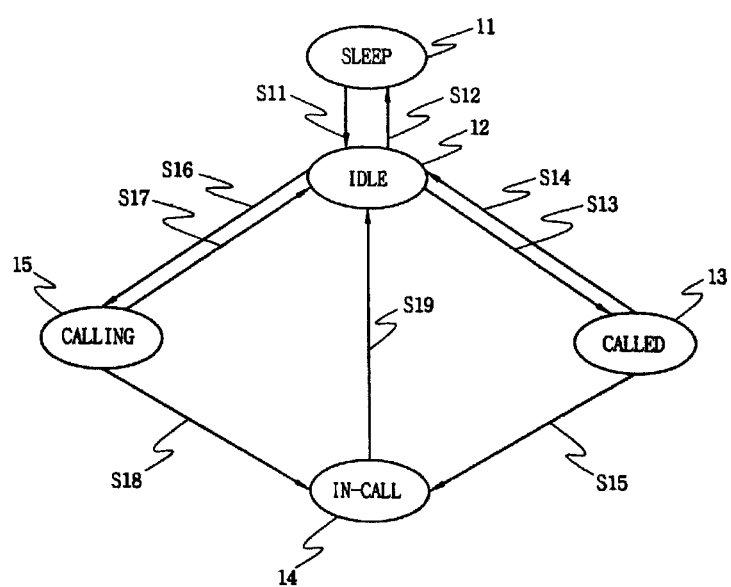
FIG. 1 is a state transition diagram of a PDA phone in accordance with the conventional art.
Figures 2, 3:
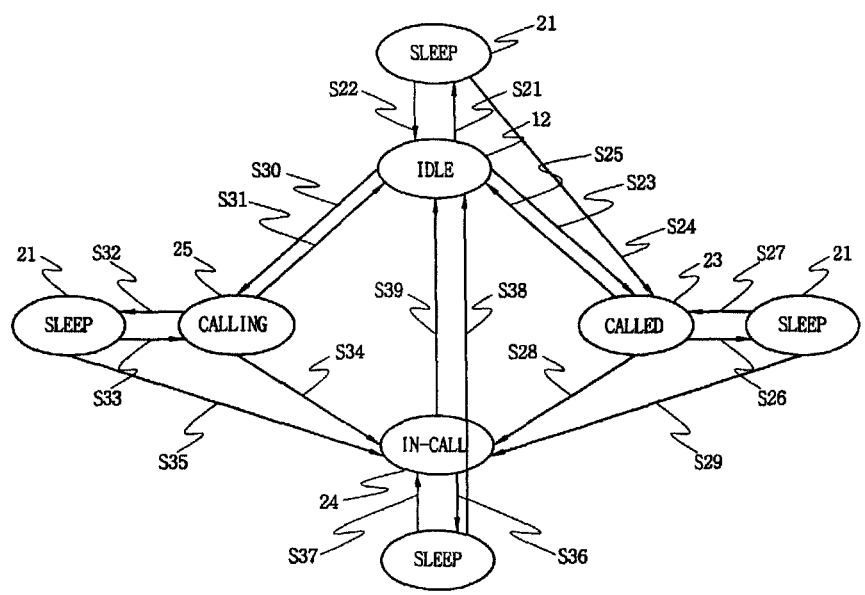
FIG. 2 is a state transition diagram of a PDA phone in accordance with the present invention.
FIG. 3 is a table showing how much power the PDA phone consumes in each mode in accordance with the present invention.

FIG. 2 is a state transition diagram of a PDA phone in accordance with the present invention.

FIG. 3 is a table showing how much power the PDA phone consumes in each mode in accordance with the present invention.

As shown in FIG. 2, the power consumption control apparatus in a PDA phone in accordance with the present invention can perform the steps of transitioning the PDA phone from an idle mode to a sleep mode automatically after a certain amount of time or by user's input signal; transitioning the PDA phone from a called mode to the sleep mode automatically after a certain amount of time or by user's input signal; transitioning the PDA phone from a calling mode to the sleep mode automatically after a certain amount of time or by user's input signal; and transitioning the PDA phone from an in-call mode to the sleep mode automatically after a certain amount of time or by user's input signal.

Hereinafter, a power consumption control method in a PDA phone in accordance with the present invention will be described in detail.

First, when the power is inputted to a PDA phone, a mode of the PDA phone becomes a sleep mode 21. Here, as shown in FIG. 3, the PDA phone in the sleep mode has 21.2 mW power consumption.

In a state of the sleep mode 21, if the user wakes up the PDA phone, the sleep mode 21 is transitioned to the idle mode 22 (S21). Here, the wake-up occurs by user's operation. For example, said user's operation can be done by pressing a specific button for a certain amount of time or more or by turning a switch on. Here, as shown in FIG. 3, the PDA phone in the idle mode has 296~525.2 mW power consumption.

In a state of the idle mode 22, the idle mode 22 is transitioned to the sleep mode 21 when the user supplies an input signal, or the idle mode 22 is automatically transitioned to the sleep mode 21 after a certain amount of time passes (S22).

In the state of the idle mode 22, the PDA phone receives a call signal, the idle mode 22 is transitioned to the called mode 23 (S23). The PDA phone consumes more power in the called mode 23 than in the sleep mode 21.

In the state of the sleep mode 21, when the PDA phone receives a call signal, the sleep mode 21 is transitioned to the called mode 23 (S24).

In a state of the called mode 23, if the call signal is no longer received because the user does not accept the received call signal, the called mode 23 is transitioned to the idle mode 22 (S25).

In the state of the called mode 23, the called mode 23 is transitioned to the sleep mode 21 when the user supplies an input signal, or the called mode 23 is automatically transitioned to the sleep mode 21 after a certain amount of time passes (S26). That is, while a bell is ringing as the PDA phone receives a call signal, the called mode 23 is transitioned to the sleep mode 21 if the bell rings for more than a time previously set by the user. Accordingly, since the PDA phone consumes more power in the called mode 23 than in the sleep mode 21, the power consumption of the PDA phone is reduced by transitioning the PDA phone from the called mode 23 to the sleep mode 21. For example, as shown in FIG. 3, the PDA phone in the called mode 23 has 296 to 525.2 mW power consumption, and PDA phone in the sleep mode 21 transitioned from the called mode has 21.2 mW power consumption.

In the state of the sleep mode 21 transitioned from the called mode 23, when the PDA phone receives the other party's call signal again, the sleep mode 21 is transitioned to the called mode 23 (S27). As a result, since the call signal is received according to a certain period, the mode of the PDA phone is alternately transitioned to the called mode 23 and the sleep mode 21 after the time previously set by the user. However, that the screen of the PDA phone is turned on and off is invisible to the naked eye because the certain period is very short. Thus, the screen of the PDA phone seems to be continuously turned on.

In the state of the called mode 23 or in the state of the sleep mode 21 transitioned from the called mode 23, if the user accepts the received call signal, the call mode 23 or the sleep mode 21 transitioned from the called mode 23 is transitioned to the in-call mode 24 (S28 and S29).

In the state of the idle mode 22, when the PDA phone sends a call signal, the idle mode 22 is transitioned to the calling mode 25 (S30). That is, if the user makes a phone call with the other party, the mode of the PDA phone becomes the calling mode 25. The PDA phone consumes much power in the calling mode 25 than in the sleep mode 21.

In a state of the calling mode 25, when the PDA phone cancels sending of the call signal, that is, when the user stops making a phone call, the calling mode 25 is transitioned to the idle mode 22 (S31).

In the state of the calling mode 25, the calling mode 25 is transitioned to the sleep mode 21 when the user supplies an input signal, or the calling mode 25 is automatically transitioned to the sleep mode 21 after a certain amount of time passes (S32). Accordingly, since the PDA phone consumes more power in the calling mode 25 than in the sleep mode 21 transitioned from the calling mode, the power consumption of the PDA phone is reduced by transitioning the PDA phone from the calling mode 25 to the sleep mode 21. Here, as shown in FIG. 3, the PDA phone in the calling mode 25 has 296 to 525.2 mW power consumption, and the PDA phone in the sleep mode 21 transitioned from the calling mode 25 has 21.2 mW power consumption.

In the state of the sleep mode 21 transitioned from the calling mode 25, when the user forcibly wakes up the PDA phone, the sleep mode 21 transitioned from the calling mode 25 is transitioned to the calling mode 25 (S33).

In the state of the calling mode 25 or in the state of the sleep mode 21 transitioned from the calling mode 25, if the user accepts the sent call signal, the calling mode 25 or the sleep mode 21 transitioned from the calling mode 25 is transitioned to the in-call mode 24 (S34 and S35).

In a state of the in-call mode 24, the in-call mode 24 is transitioned to the sleep mode 21 when the user supplies an input signal, or the in-call mode 24 is automatically transitioned to the sleep mode 21 after a certain amount of time passes (S36). That is, if the user presses a button for transitioning the mode of the PDA phone to the sleep mode 21 or if talk time with other party exceeds a certain amount of time, the mode of the PDA phone becomes the sleep mode 21. Accordingly, since the PDA phone consumes more power in the in-call mode 24 than in the sleep mode 21 transitioned from the in-call mode, the power consumption of the PDA phone is reduced by transitioning the PDA phone from the in-call mode 24 to the sleep mode 21. Here, as shown in FIG. 3, the PDA phone in the in-call mode 24 has 1389 to 2049.8 mW power consumption, and the PDA phone in the sleep mode 21 transitioned from the in-call mode 24 has 1334.7 to 1926.0 mW power consumption.

In the sleep mode 21 transitioned from the in-call mode 24, if the user wakes up the PDA phone, the sleep mode 21 transitioned from the in-call mode 24 is transitioned to the in-call mode 24 (S37).

In the state of the in-call mode 24 or in the state of the sleep mode 21 transitioned from in-call mode 24, when the phone call is terminated, the in-call mode 24 or the sleep mode 21 transitioned from the in-call mode 24 is transitioned to the idle mode 22 (S38 and S39).

As so far described in detail, a power consumption control apparatus and a method thereof in a PDA phone in accordance with the present invention can reduce the power consumption of the PDA phone by transitioning the PDA phone from a called mode, an in-called mode and a calling mode to a sleep mode, and cope with the circumstances which may occur in every state of the PDA phone.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile device configured to control power consumption, the mobile device comprising:
    a display screen;
    a detector configured to detect at least one of an active input or a passive condition, wherein the passive condition is determined to be present based on a comparison of a device state or a change in the device state to a threshold; and
    a controller configured to perform operations in response to the detected active input or passive condition, wherein the operations include:
        when the mobile device is operative in an idle mode, transition the mobile device from the idle mode to a first sleep mode in response to the detected active input or passive condition, or
        when the mobile device is operative in a called mode, transition the mobile device from the called mode to a second sleep mode in response to the detected active input or passive condition, or
        when the mobile device is operative in an in-call mode, transition the mobile device from the in-call mode to a third sleep mode in response to the detected active input or passive condition,
    wherein the mobile device in the first sleep mode is configured to consume less power than the idle mode, the mobile device in the second sleep mode is configured to consume less power than the called mode, the mobile device in the third sleep mode is configured to consume less power than the in-call mode, the mobile device in the idle mode is configured to consume less power than the called mode, and the mobile device in the called mode is configured to consume less power than the in-call mode.

2. The mobile device of claim 1, wherein the amount of power supplied to the display screen is discontinued in the first, second, or third sleep mode.

3. The mobile device of claim 1, wherein a light emission from the display screen is discontinued in the first, second, or third sleep mode.

4. The mobile device of claim 1, wherein the mobile device comprises a user key for input, wherein the active input comprises an input from the user key to invoke the first, second, or third sleep mode while in the idle mode, called mode, or in-call mode.

5. The mobile device of claim 1, wherein the passive condition comprises a timeout condition, wherein the threshold comprises the timeout condition, wherein the mobile device is configured for operations comprising:
    accessing the timeout condition;
    identifying a starting time;
    taking a temporal measurement beginning at the starting time;
    monitoring for the active input while taking the temporal measurement;
    in the absence of receiving the active input,
        taking the temporal measurement;
        comparing the temporal measurement against the timeout condition;
        determining when the temporal measurement reaches the timeout condition; and
        upon determining that the timeout condition has been reached, invoking the first, second, or third sleep mode directly from within in the idle mode, called mode, or in-call mode.

6. The mobile device of claim 1, wherein the operational modes further comprise a calling mode, wherein the mobile device is configured such that the calling mode consumes more power than when the device is in a fourth sleep mode invoked in response to the detected active input or passive condition and the in-call mode consumes more power than the calling or the called modes.

7. The mobile device of claim 6, wherein the calling mode exists when an attempt to establish a voice communication channel with another party is conducted.

8. The mobile device of claim 1, wherein the display screen is disabled from emitting light in the first, second, or third sleep mode.

9. The mobile device of claim 1, wherein the passive condition comprises a condition that results from input that is not directly provided by a user of the mobile communication device.

10. The mobile device of claim 1, wherein the controller is configured to enter the first, second, or third sleep mode directly from within the called or in-call mode without entering the idle mode.

11. A mobile device configured to control power consumption, the mobile device comprising:
 a speaker to deliver a sound from the mobile communication device;
 a microphone to receive at least a voice communication at the mobile device;
 a display screen to present data to a user of the mobile device;
 a power supply to receive power from a power source;
 a transmitter to send transmitted data;
 a receiver to receive incoming data wherein the mobile device includes operation modes comprising a first sleep mode, a second sleep mode, a third sleep mode, an idle mode, a called mode, and an in-call mode; and
 a controller configured to perform operations in response to the detected active input or passive condition, wherein the operations include:
  when the mobile device is operative in the idle mode, transition the mobile device from the idle mode to the first sleep mode in response to receiving the input or detecting the condition, or
  when the mobile device is operative in the called mode, transition the mobile device from the calling mode to the second sleep mode in response to receiving the input or detecting the condition, or
  when the mobile device is operative in the in-call mode, transition the mobile device from the in-call mode to the third sleep mode in response to receiving the input or detecting the condition,
 wherein the mobile device in the first sleep mode is configured to consume less power than the idle mode, the mobile device in the second sleep mode is configured to consume less power than the called mode, the mobile device in the third sleep mode is configured to consume less power than the in-call mode, and the mobile device in the third sleep mode is configured to consume more power than in the first or second sleep modes.

12. The mobile device of claim 11, wherein the amount of power supplied to the display screen is discontinued in the first, second or third sleep mode.

13. The mobile device of claim 11, wherein a light emission from the display screen is discontinued in the first, second or third sleep mode.

14. The mobile device of claim 11, wherein the mobile device comprises a user key for input, wherein the input comprises an input from the user key while in the idle mode, called mode or in-call mode.

15. The mobile device of claim 11, wherein the condition comprises a timeout condition, wherein the threshold comprises the timeout condition, wherein the method further comprises:
 accessing the timeout condition;
 identifying a starting time;
 taking a temporal measurement beginning at the starting time;
 monitoring for the input while taking the temporal measurement;
 in the absence of receiving the input,
  taking the temporal measurement;
  comparing the temporal measurement against the timeout condition;
  determining when the temporal measurement reaches the timeout condition; and
  upon determining that the timeout condition has been reached, invoking the first, second or third sleep mode directly from within in the idle mode, called mode or in-call mode.

16. The mobile device of claim 11, wherein the operational modes further comprise a calling mode, wherein the mobile device is configured such that the calling mode consumes more power than when the device is a fourth sleep mode invoked in response to receiving the input or detecting the condition and the in-call mode consumes more power than the calling mode.

17. The mobile device of claim 16, wherein the called or calling mode exists when an attempt to establish a voice communication channel with another party is conducted.

18. The mobile device of claim 11, wherein the display screen is disabled from emitting light in the first, second or third sleep mode.

19. The mobile device of claim 11, wherein the condition comprises a condition that results from input that is not directly provided by a user of the mobile communication device.

20. The mobile device of claim 11, wherein the controller is configured to enter the first, second or third sleep mode directly from within the called or in-call mode without entering the idle mode.

21. A method to control power consumption in a mobile device, the method comprising:
 detecting at least one of an active input or a passive condition, wherein the passive condition is determined to be present based on a comparison of a device state or a change in the device state to a threshold; and performing operations in response to the detected active input or passive condition, wherein the operations including:
  when the mobile device is operative in a idle mode, transition the mobile device from the idle mode to a first sleep mode in response to the detected active input or passive condition, or
  when the mobile device is operative in a called mode, transition the mobile device from the called mode to a second sleep mode in response to the detected active input or passive condition, or
  when the mobile device is operative in a in-call mode, transition the mobile device from the in-call mode to the third sleep mode in response to the detected active input or passive condition,
 wherein the mobile device in the first sleep mode is configured to consume less power than the idle mode, the mobile device in the second sleep mode is configured to consume less power than the called mode, the mobile device in the third sleep mode is configured to consume less power than the in-call mode, the mobile device in the idle mode is configured to consume less power than the called mode, and the mobile device in the called mode is configured to consume less power than the in-call mode.

22. The method of claim 21, wherein the amount of power supplied to the display screen is discontinued in the first, second or third sleep mode.

23. The method of claim 21, wherein a light emission from the display screen is discontinued in the first, second or third sleep mode.

24. The method of claim 21, wherein the passive condition comprises a timeout condition, wherein the threshold comprises the timeout condition, wherein the method further comprises:
- accessing the timeout condition;
- identifying a starting time;
- taking a temporal measurement beginning at the starting time;
- monitoring for the active input while taking the temporal measurement;
- in the absence of receiving the active input,
  - taking the temporal measurement;
  - comparing the temporal measurement against the timeout condition;
  - determining when the temporal measurement reaches the timeout condition; and
  - upon determining that the timeout condition has been reached, invoking the first, second or third sleep mode directly from within in the idle mode, called mode or in-call mode.

25. The method of claim 21, wherein the operational modes further comprise a calling mode, wherein the mobile device is configured such that the calling mode consumes more power than when the device is a fourth sleep mode invoked in response to receiving the input or detecting the condition and the in-call mode consumes more power than the calling mode.

26. The mobile device of claim 21, wherein the display screen is disabled from emitting light in the first, second or third sleep mode.

27. A method to control power consumption in a mobile device, the mobile device including operational modes comprising a first sleep mode, a second sleep mode, a third sleep mode, an idle mode, a called mode, and an in-call mode, the method comprising:
- receiving an input or detecting a condition; and
- performing operations including:
  - when the mobile device is operative in the idle mode, transition the mobile device from the idle mode to the first sleep mode in response to receiving the input or detecting the condition, or
  - when the mobile device is operative in the called mode, transition the mobile device from the called mode to the second sleep mode in response to receiving the input or detecting the condition, or
  - when the mobile device is operative in the in-call mode, transition the mobile device from the in-call mode to the third sleep mode in response to receiving the input or detecting the condition,
- wherein the mobile device in the first sleep mode is configured to consume less power than the idle mode, the mobile device in the second sleep mode is configured to consume less power than the called mode, the mobile device in the third sleep mode is configured to consume less power than the in-call mode, and the mobile device in the third sleep mode is configured to consume more power than in the first or second sleep modes.

28. The method of claim 27, wherein the amount of power supplied to the display screen is discontinued in the first, second or third sleep mode.

29. The method of claim 27, wherein a light emission from the display screen is discontinued in the first, second or third sleep mode.

30. The method of claim 27, wherein the condition comprises a timeout condition, wherein the threshold comprises the timeout condition, wherein the method further comprises:
- accessing the timeout condition;
- identifying a starting time;
- taking a temporal measurement beginning at the starting time;
- monitoring for the input while taking the temporal measurement;
- in the absence of receiving the input,
  - taking the temporal measurement;
  - comparing the temporal measurement against the timeout condition;
  - determining when the temporal measurement reaches the timeout condition; and
  - upon determining that the timeout condition has been reached, invoking the first, second or third sleep mode directly from within in the idle mode, called mode or in-call mode.

31. The method of claim 27, wherein the operational modes further comprise a calling mode, wherein the mobile device is configured such that the calling mode consumes more power than when the device is a fourth sleep mode invoked in response to receiving the input or detecting the condition, and the in-call mode consumes more power than the calling mode.

32. The method of claim 27, wherein the display screen is disabled from emitting light in the first, second or third sleep mode.

* * * * *